United States Patent [19]

Graybill

[11] 3,767,837

[45] Oct. 23, 1973

[54] HIGH-VOLTAGE PRESSURIZED GAS-INSULATED POWER TRANSMISSION SYSTEMS

[75] Inventor: Howard W. Graybill, Greensburg, Pa.

[73] Assignee: I-T-E Imperial Corporation, Philadelphia, Pa.

[22] Filed: Aug. 24, 1972

[21] Appl. No.: 283,529

[52] U.S. Cl. .................. 174/27, 174/16 B, 174/28, 174/99 B
[51] Int. Cl. ............................................. H01b 9/06
[58] Field of Search ..................... 174/27, 28, 16 B, 174/88 B, 99 B, 111; 158/113, 114, 121, 122

[56] References Cited
UNITED STATES PATENTS

| | | | |
|---|---|---|---|
| 3,361,870 | 1/1968 | Whitehead | 174/99 B |
| 3,391,243 | 7/1968 | Whitehead | 174/88 B X |
| 3,585,271 | 6/1971 | Reynolds | 174/28 X |
| 3,349,168 | 10/1967 | Rehder et al | 174/99 B |
| 3,610,947 | 10/1971 | Stephanides | 174/28 X |
| 2,141,912 | 12/1938 | Hobart | 174/27 |

*Primary Examiner*—Bernard A. Gilheany
*Assistant Examiner*—A. T. Grimley
*Attorney*—Sidney G. Faber et al.

[57] ABSTRACT

A multiphase high-voltage pressurized gas insulated electrical power transmission system for underground applications incorporating a central conductor for each phase, each central conductor being mounted within a grounded conductive housing concentrically arranged with its associated central conductor with the concentric alignment being maintained by insulating spacers. Each of the central conductors and associated housings for the multiphase system are mounted within a steel housing and arranged in a triangular or delta configuration. Conductors of adjacent sections are joined by suitable dielectrically shielded plug-in contact assemblies which provide for electrical continuity between adjacent central conductors of the multiphase bus assembly sections. The concentric grounded housings are preferably perforated to facilitate egress of contaminating particles which may be present within the interior of each grounded housing. The outer steel housing sections are joined, end to end by butt joint welding techniques.

In another preferred embodiment, the grounded aluminum housings surround only selected portions of their associated inner conductors and single ground screen means are employed in each housing section for collection of contaminating particles which may be present within the assembly.

8 Claims, 5 Drawing Figures

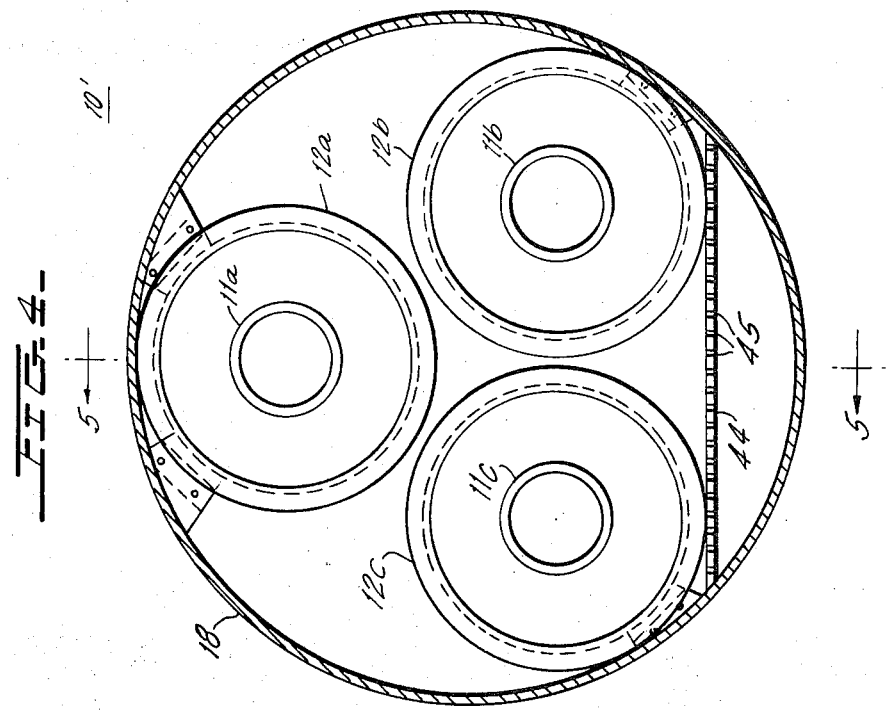
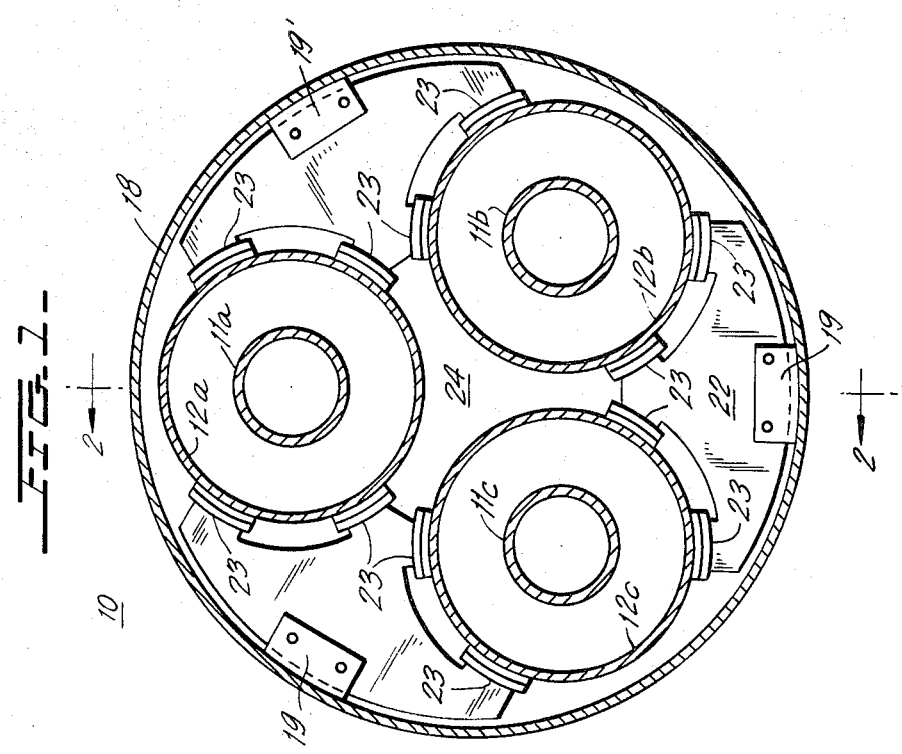

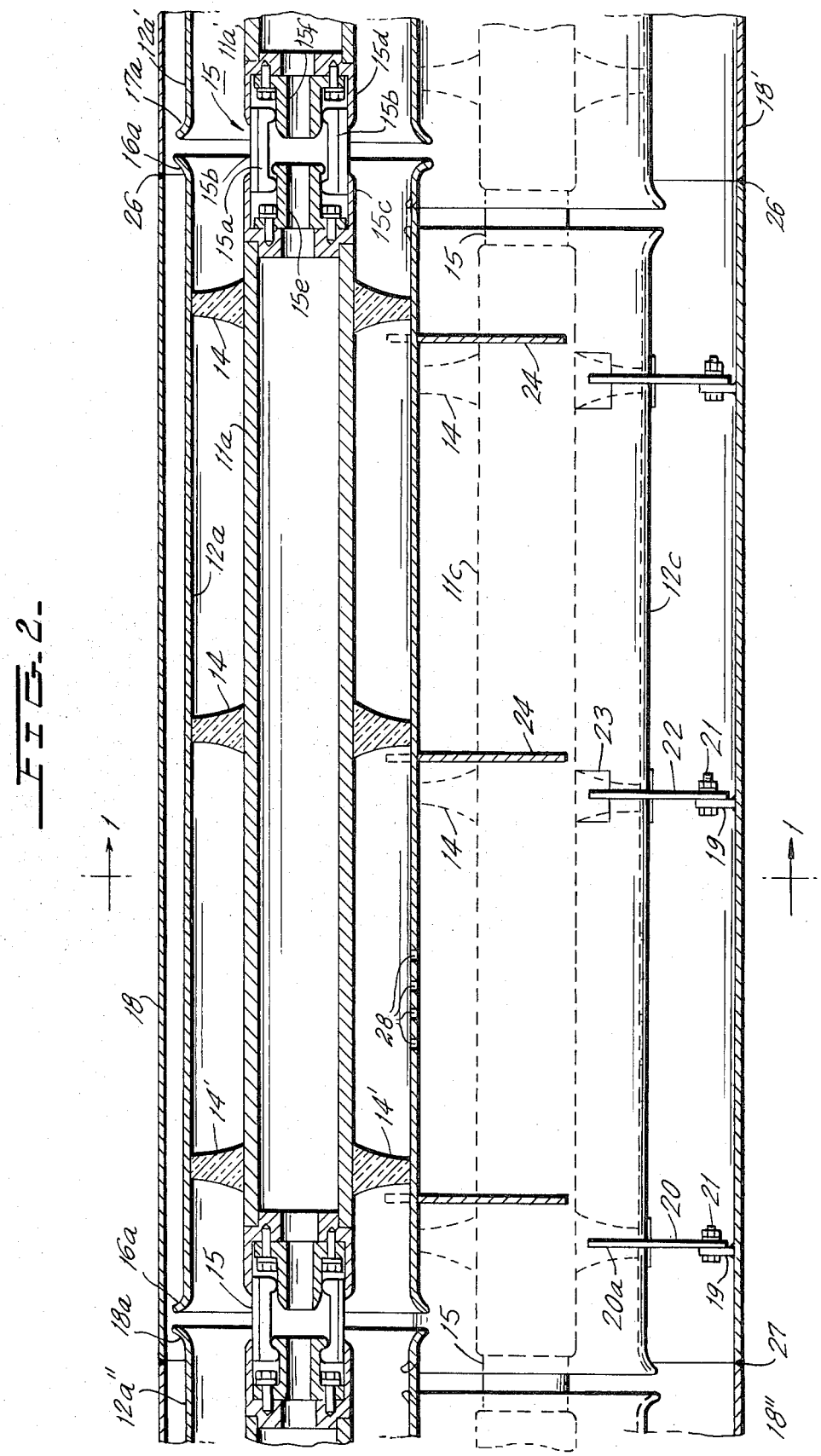

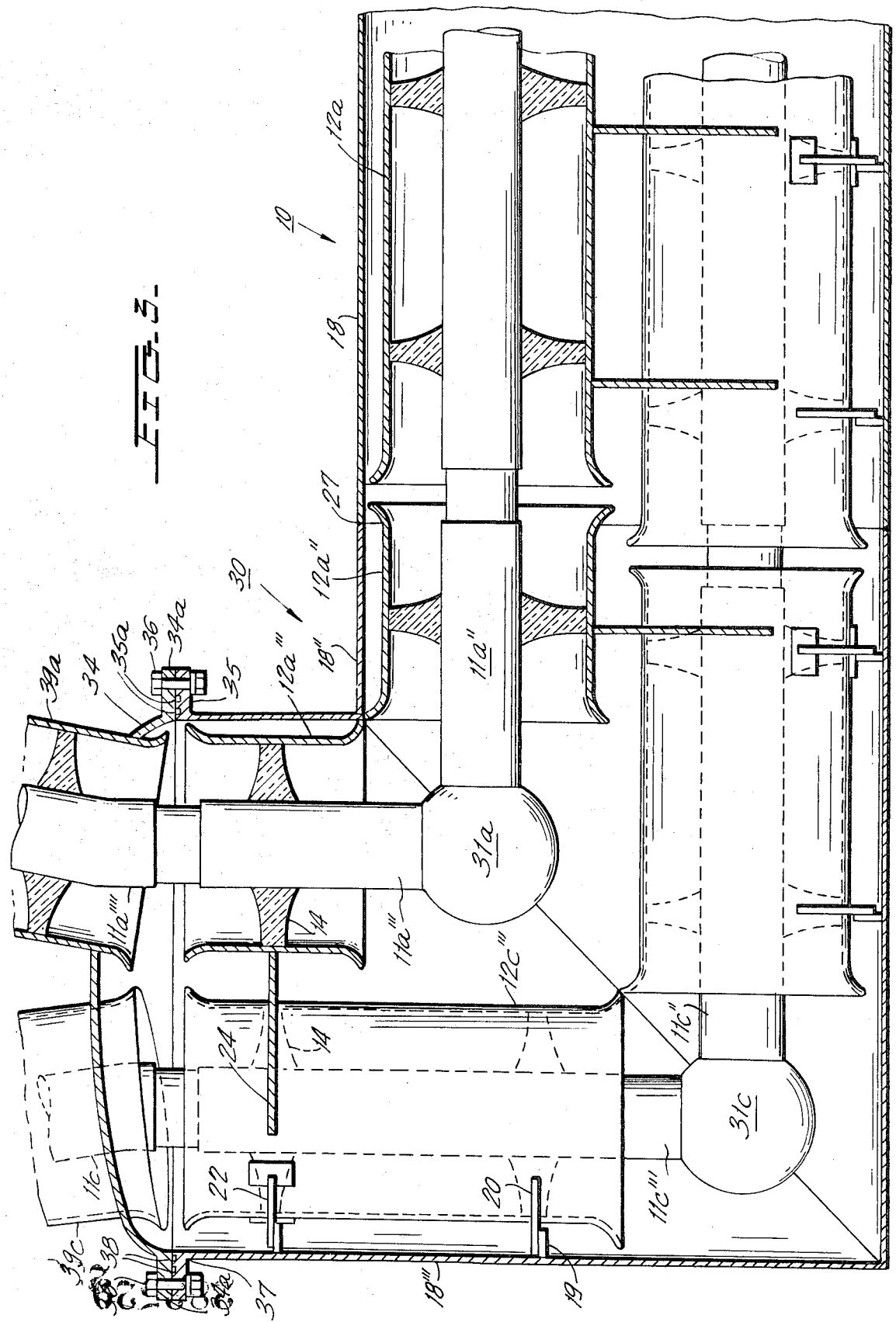

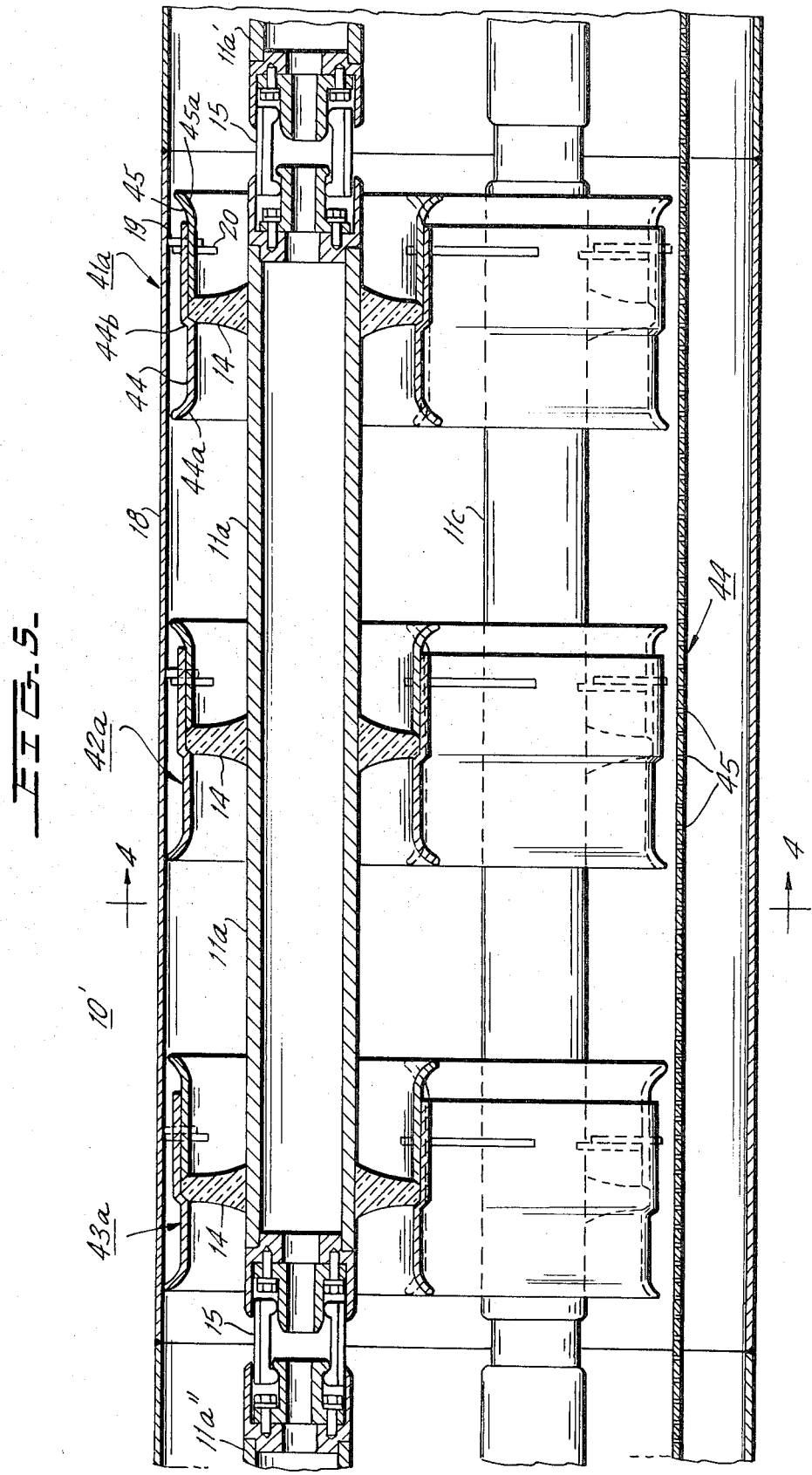

HIGH-VOLTAGE PRESSURIZED GAS-INSULATED POWER TRANSMISSION SYSTEMS

The present invention relates to high-voltage pressurized gas insulated electrical power transmission systems and more particularly to underground applications for such systems wherein the conductive assemblies for each phase of the multi-phase system are mounted within a single steel housing and arranged in triangular or delta fashion therein to facilitate and simplify underground installation.

BACKGROUND OF THE INVENTION

Pressurized-gas-insulated electrical power transmission systems are extremely advantageous for use due to their capability of transmitting power at extremely high voltage and current ratings. Typical of such structures are the teachings of U.S. Pat. Nos. 3,573,342; 3,573,341; and 3,546,356, all of which are assigned to the assignee of the present invention, the IEEE Technical Paper 69 TP24-PWR, and Electrical Light and Power, Oct. 1970, pages 66–68. These references describe and disclose a power transmission system with three isolated phases in which each phase is comprised of an inner conductor tube and an outer concentric enclosure tube, both preferably formed of aluminum, with the hollow interior space therebetween being filled with a pressurized gas such as sulphur hexafluoride ($SF_6$) to provide excellent electrical insulation between the high voltage conductor tube and the enclosure tube which is conventionally grounded. Insulating spacers are employed at periodic intervals to maintain the inner and outer tubes in their concentric relationship. The three phases are usually installed in a horizontal configuration and in a spaced parallel relationship with about one foot clearance between adjacent enclosure tubes to permit field welds to be made around the joints in the enclosure tube of each phase whereby the bus sections of each phase, arranged in end to end fashion, are mechanically and electrically joined to one another. The entire system can be buried in high thermal conductive sand, if desired.

In such systems, the current flowing in the inner or central conductor induces a voltage in the enclosure tube. Most systems considered to date contemplate electrical bonding of the three enclosure tubes at their extreme ends so that there is no potential difference along the length of the enclosure tube. However, each enclosure tube carries a current substantially equal in magnitude and opposite in sign (i.e., in direction, at any given instant) to that flowing in the tubular central conductor. The aforesaid currents are present if the conductors are carrying alternating current and if there is no zero phase sequence (i.e., ground return) current flowing so that the currents in the three phases add vectorially to zero with the result that substantially no magnetic field exists outside of the enclosure tubes.

Whereas systems of the aforementioned type appear to be practicable, such systems have been found to have the following problems and disadvantages:

Great care must be employed to insure extreme cleanliness in factory assembly, handling, shipment and installation to insure the total absence of free conducting particles in the gas space between the two concentrically oriented tubes making up each phase. Clean $SF_6$ gas has excellent insulating properties, with the dielectric strength increasing roughly proportional to its absolute pressure. However, the presence of particles of metal or graphite in the gas will appreciably reduce the voltage at which the dielectric breakdown (flashover) will occur within a given configuration at a predetermined pressure. This is due to the fact that the conducting particles become charged in the presence of a high-voltage electric field and are caused to move back and forth rapidly between the conductor and enclosure tubes, causing sparking when they touch the conductor, initiating partial discharges and thereby reducing the flashover voltage. Tests have shown that typical isolated phase sections assembled with average care experience impulse flashover when the maximum voltage gradient reaches about 360–400 volts per mil. However, when the same section is scrupulously cleaned and absolutely free of conducting particles within the $SF_6$ gas, flashover is raised to maximum gradients as high as 500 bolts per mil. However, it is extremely difficult to maintain present systems free of such particles because their sources are legion, to wit:

extruded aluminum tubes have loose particles adhering to their surfaces, which can be freed by vibration, vacuum, or high-voltage dielectric fields;

extruded aluminum tubes contain graphite on their surfaces, the graphite being employed as a lubricant in the extrusion process which results in the graphite becoming imbedded in the inner wall. Graphite particles can also be freed under certain conditions;

machining, grinding and sanding operations employed during fabrication generate fine metallic chips and dust which tend to lodge in cracks and float in the air and are difficult to keep out of the system; any rubbing or sliding of two aluminum surfaces can generate free particles, in shop assembly operations, in vibration during shipment, and in assembly at the job site;

welding tends to release very fine aluminum dust, particularly the consumable electrode, inert-gas-shielded (MIG) process.

The enclosure tube for each phase constitutes a pressure vessel, and the circumferential welded joints which are formed to mechanically join and hermetically seal adjacent sections which are arranged end to end must be of sufficient strength to avoid being broken or cracked under the stresses imposed by the pressure of the gas (which are typically no problem) or the stresses due to thermal expansion and contraction (which can be quite high if the system is installed in cold weather and reaches high temperatures when carrying full load current in a hot, dry summer). Aluminum has a high coefficient of thermal expansion, and relatively poor strength of welds, as compared to steel, for example. If the enclosure tube cannot expand and contract freely, welds can be highly stressed by the thermal forces present. These stresses can be relieved to some extent by the insertion of expansion bellows at frequent intervals along the length of each enclosure tube section, but such bellows, which must be enclosed to keep sand or other material out of the region between adjacent corrugations, add significantly to the cost of the system.

Because of the need to keep the system particle or contaminate free, and because protrusions of solidified and weld metal cannot be permitted to extend inwardly from the enclosure tube toward the conductor, butt welds cannot be employed in joining sections of the enclosure tube. Instead, overlapping joints with fillet welds are employed. However, such fillet welds do not provide the structural strength afforded to a system having butt welds, particularly when the joined sections are in compression.

Since the fillet welds employed in joining aluminum tubes are not nearly as strong as butt welds which are employed for joining sections of steel pipe, it appears to risky—too fisky—i.e., too likely to overstress the aluminum welds— to follow the standard pipe line practice of welding joints and applying corrosion protection coatings above ground level and then lowering the welded pipe into place in the trench as welding and coating operations proceed. Instead, shipping lengths are precoated in the factory to within about 6 inches of the welded joints, and joints are welded and coated in their final position after adjacent end to end sections have been lowered into the trench. These techniques add substantially to the installation costs.

The art of corrosion protection of underground and underwater aluminum piping is not as well understood or as well developed as corrosion protection of steel piping under the same conditions, largely due to the fact that there has been greater experience and application of steel piping for use in underground and underwater installations. It has further been found that cathodic protection of underground aluminum piping is much more difficult than cathodic protection of underground steel piping. Corrosion of underground steel piping can be prevented by making sure that there is adequate cathodic potential (or current) applied. With aluminum, however, either too much or too little cathodic protection has been found to cause corrosion (erosion) of the aluminum tube.

BRIEF DESCRIPTION OF THE INVENTION

The present invention is characterized by providing an underground assembly for multiphase, high-voltage pressurized-gas-insulated electrical power transmission systems which substantially overcomes all of the aforementioned disadvantages and problems while at the same time maintaining all of the advantageous features of conventional underground in-stallations.

The present invention is comprised of an underground assembly having a steel enclosure tube of sufficient inner diameter to surround and enclose all phases of a multiphase pressurized bus system. The bus for each phase comprises an inner tubular conductor surrounded by a grounded conductive housing, with the tubes of each phase preferably being formed of aluminum. Means are provided within the steel enclosure tube for mechanically and electrically joining the grounded housings of each phase to the steel enclosure tube. The concentric orientation between each inner tubular conductor and its associated surrounding housing is maintained through the use of insulating spacers arranged at spaced intervals along the length of each bus section. The means for electrically and mechanically joining the grounded conductors to the steel enclosure tube also serve to maintain the bus sections of the phases in a predetermined orientation such as, for example, a triangular or delta arrangement. Each end of each inner tubular conductor is provided with a plug-in contact assembly of the type described in copending application Ser. No. 137,322, filed Apr. 26, 1971, now U.S. Pat. No. 3,713,075 issued Jan. 23, 1973 and assigned to the assignee of the present invention. The inner tubular conductors are then joined end to end by the plug-in contacts while the ends of the adjacent housing surrounding the inner tubular conductors are maintained in spaced relationship. The ends of adjacent steel enclosure tubes, arranged in end to end fashion are then butt welded to mechanically join the enclosure tubes to one another and to hermetically seal the entire assembly. The grounded concentric housings are preferably perforated to permit the egress of any particles or other contaminates within the assembly to enable these particles to be collected within the "dead space" between the exterior surfaces of the concentric housings and the interior surface of the steel enclosure tube.

In an alternative embodiment, the concentric housings are comprised of a plurality of short sections arranged at generously spaced intervals preferably at the location of each insulating spacer and a single perforated screen positioned near the base of the steel enclosure tube is employed for collecting particles or other contaminates.

It is therefore one object of the present invention to provide a novel assembly for use in underground installation of high-voltage pressurized-gas-insulated electrical power transmission systems in which increased strength, reduced installation costs and simplified maintenance procedures are made possible through the novel arrangement employed.

BRIEF DESCRIPTION OF THE FIGURES

The above as well as other objects of the present invention will become apparent when reading the accompanying description and drawings in which:

FIG. 1 is a transverse cross-sectional view through one preferred embodiment of a multiphase transmission system incorporating the principles of the present invention and extremely advantageous for use in underground and/or underwater power transmission.

FIG. 2 is a vertical longitudinal section looking in the direction of arrows 2—2 of FIG. 1.

FIG. 3 is a vertical section taken through an elbow or corner construction of the present invention and further showing a termination structure in the same system.

FIG. 4 shows a transverse cross-sectional view of another embodiment of the multiphase underground transmission system of the present invention.

FIG. 5 is a vertical longitudinal section of the alternative embodiment of FIG. 4 looking in the direction of arrows 5—5 of FIG. 4.

DETAILED DESCRIPTION OF THE FIGURES

FIGS. 1–3 show one preferred embodiment 10 of the present invention which is adapted for use in three phase transmission systems and comprises phase conductor tubes 11a, 11b and 11c. Each of the tubes 11a–11c are preferably formed of aluminum having substantially thick walls and outer diameters of the order of 3–6 inches, depending upon the voltage and current rating of the system. Tubular conductors 11a–11c are maintained at a high voltage with respect to ground. Each of the tubular conductors are surrounded by concentrically aligned enclosure tubes 12a, 12b and 12c, respectively, each preferably being formed of aluminum and being grounded in a manner to be more fully described. These tubes are of the order of 10–20 inches in diameter, again depending upon the voltage rating of the system. The conductor tubes 11a–11c are maintained in concentric relationship relative to their associated grounded housing 12a–12c by means of insulating spacers 14, shown in FIG. 2, which support their associated central conductors 11a–11c, respectively. For each length of a bus assembly section 10, at least one of the insulating spacers, for example, spacer 14' of each phase, is locked to both its central conductor and its grounded housing to prevent longitudinal motion of the conductor. However, each conductor 11a–11c is free to slide through the remaining insulators to allow for differential thermal expansion and contraction. The insulators 14 and 14' are illustrated as disc-shaped insulating spacers, but these spacers could have many different configurations, such as a conical shape, or be comprised of multiple insulators such as three post type insulators spaced 120° apart between the phase conductor tubes 11a, etc., and enclosure tubes 12a, etc.

The ends of the conductor tubes of each assembly section 10 are provided with dielectrically shielded plug-in contact assemblies 15 for electrically and mechanically connecting the inner conductors of associated phases. Such plug-in contact assemblies are described in detail in copending application, Ser. No. 137,322, filed Apr. 26, 1971, now U.S. Pat. No. 3,713,075 issued Jan. 23, 1973 and assigned to the assignee of the present invention, which application is incorporated herein by reference thereto. For purposes of simplicity, it is sufficient to understand that the plug-in contact assemblies 15 are each comprised of a plurality of contact fingers 15a arranged in spaced fashion about the interior of a hollow cylindrical housing 15b which is telescopingly received by projecting cylindrical portions 15c and 15d extending toward the plug-in contact assembly so as to cooperatively form a dielectric shield with hollow cylindrical conductive housing 15b. The plug-in contacts 15a are spring-loaded so as to engage the projections 15e and 15f coupled to and extending from inner conductors 11a and 11a', for example, by suitable fastening members.

Adjacent sections of the grounded housings 12a'', 12a, 12a' are not fastened together in any way and in fact are arranged so that their adjacent ends are spaced from one another by a distance of at least several inches at installation temperature so that, even though they tend to expand as their temperature increases, the free ends do not touch or engage one another at the highest anticipated operating temperatures. The extreme ends of the grounded housings are flared for the purpose of eliminating high voltage gradients at their end points. Note FIG. 2, for example, which shows grounded housing 12a as having flared porions 16a, 16a at its free ends which are spaced from the flared free end 17a of grounded housing 12a' and from the flared free end 18a of grounded housing 12a''. The grounded housings of the other phases are flared and spaced from adjacent grounded housings in a similar fashion.

The embodiment 10 of FIGS. 1–3 is further comprised of a tubular enclosure 18, preferably formed of steel and adapted to surround the grounded housings 12a–12c in the manner best shown in FIG. 1. Tabs 19 are welded to the interior of enclosure tube 18, which is preferably formed of steel, at equispaced intervals around the interior surface thereof (see FIG. 1), as well as at substantially equispaced intervals along the length of enclosure tube 18 (note FIG. 2). At one end of each section 10, the assembly is provided with three metallic braces or support plates 20 (see FIG. 2) which are welded to the grounded housings 12a–12c with the support plate 20 of FIG. 2 being shown as secured to grounded housing 12c by a weldment provided at 20a. The support plates 20 are bolted to the tabs 19 by suitable fastening means 21 (see FIG. 2) to rigidly support the grounded housings and to electrically connect them to the steel enclosure tube 18. At other points, similar support plates 22 are employed, but each of these is provided with a plurality of pads 23 which are coated with a material having a low coefficient of friction (i.e., Teflon) along their concave surfaces which engage the exterior surfaces of the grounded housings 12–12c in order to support the grounded housings 12a–12c while freely permitting longitudinal movement thereof to allow for thermal expansion of the grounded housings 12a–12c. The three grounded housings are held in their properly spaced relationship by means of "Y-shaped" plates 24 arranged at spaced intervals along the length of each section 10, which plates are welded to the grounded housings 12a–12c to maintain them in their triangular or "delta" configuration.

FIG. 2 shows the steel enclosure tube 18 being arranged in end to end fashion with associated enclosure tubes 18' and 18''. Butt welds 26 and 27 are arranged for electrically and mechanically joining enclosure 18 to enclosure 18' and to enclosure 18'' which serves as the means for hermetically or air-tightly sealing the three tubes (18, 18' and 18'') to one another.

The grounded housings 12a–12c are perforated so as to be provided with many small holes 28 along their length (only a few holes have been shown for purposes of simplicity). When the transmission system is completed (i.e., pressurized with $SF_6$, for example) and is energized, any metallic particles present in the dielectric field created between the conductors of each phase (11a–11c) and their associated grounded housings, "dance" in a random manner between the conductor and its associated grounded housing. Eventually, each and every particle finds its way through one of the openings 28 in the grounded housings so as to enter into the space between the exteriors of the grounded housings and the interior of steel enclosure tube 18. Since housings 12a–12c and tubular enclosure 18 are all at ground potential, there is no dielectric field existing between them and the metallic particles are caused to fall harmlessly to the bottom of the steel enclosure tube, where they will remain.

FIG. 3 shows an arrangement in which the underground assembly sections may be terminated with an elbow portion 30. In this embodiment, steel enclosure tube 18 is shown as being butt-welded to enclosure 18' with the weldment being shown at 27. The grounded housing 12a'' is shown as being of substantially reduced length as compared with grounded housing 12a so that its right-hand end terminates substantially at the inner portion of the elbow. Grounded housing 12c'' is shown as being greater in length than housing 12a'' so as to extend further toward the outer portion of the elbow or bend. The inner conductors 11a'' and 11c'' are shown as being terminated in spheres 31a and 31c of substantially enlarged diameter relative to their associated inner conductors 11a'' and 11c''. The grounded housings are shown as being terminated at points which completely expose the enlarged spheres. Although not shown in FIG. 3, it should be understood that a similar construction is provided for the remaining phase of the three-phase system, which has been omitted from FIG. 3 for purposes of simplicity. The vertical portion of the elbow section 30 is comprised of inner conductors 11a''' and 11c''' each electrically connected to the associated spheres 31a and 31c and each being surrounded by grounded housings 12a''' and 12c''', respectively, with the concentric arrangement between associated inner conductors and concentrically arranged grounded housings being obtained through the use of the insulating spacers 14. The grounded housings are similarly secured to a vertically aligned steel enclosure tube 18''' by brackets and fittings similar to those shown in FIGS. 1 and 2 and which have been designated by like numerals.

Where the transmission system emerges from the ground or from an underwater installation, a dish-shaped conductive head 34, preferably formed of aluminum, and provided with a welded flange 34a, is bolted to a flange 35 by fastening members 36, flange 35 being welded to the vertical section of steel enclosure tube 18''' with the weldment being shown at 37. Double gaskets 38 are provided between the steel and aluminum flanges to prevent gas leakage at this point. These gaskets may be seated within annular-shaped grooves 35a provided in flange 35.

The grounded conductive housings 39a–39c, one being provided for each phase of the system, are welded into the dish-shaped head 34 at slightly diverging angles, as shown best in FIG. 3. Above this point, the conventional isolated phase concentric tubular conductors, for example as shown and described in copending applications Ser. Nos. 809,889; 813,181 and 813,168 extend up into the entrance bushings about 20 feet above dish-shaped head 34. The tops of the bushings are spaced far enough apart for adequate phase clearance in air.

FIGS. 4 and 5 show another preferred embodiment of the present invention wherein like elements designate like components as between FIGS. 4 and 5 and the previously described FIGS. 1–3. In the embodiment 10' of FIGS. 4 and 5, the construction is quite similar to that shown in FIGS. 1–3 except that the grounded housing sections of alternative embodiment 10' are quite short in length and extend a very short distance to either side of the insulating spacers 14. For example, phase "A" of the preferred embodiment of FIGS. 4 and 5 is shown as being comprised of a central conductor 11a mechanically and electrically joined to conductors 11a and 11'' of associated bus sections by means of the dielectrically shielded plug-in contact assemblies 15,15. Inner conductor 11a, which is normally maintained at an elevated voltage relative to the grounded housing sections, is fitted with a plurality of insulating spacers 14 each of which concentrically maintains and supports a grounded housing section 41a, 42a and 43a in concentric relationship to their common central conductor 11a. Since each of these assemblies is substantially identical in configuration and function, only one will be described herein for purposes of simplicity. As shown best at the right-hand end of FIG. 5, grounded housing section 41a is comprised of two housing portions 44 and 45 each having flared outer ends 44a and 45a, respectively. Section 44 is bent at 44b to form a shoulder against which the left-hand edge of insulating spacer 14 rests. Grounded housing section 45 is telescopingly received within the right-hand portion of grounded housing section 44 so that its extreme left-hand edge rests against the right-hand outermost edge of insulating spacer 14. The sections 44 and 45 are preferably welded to one another so as to maintain the outer peripheral edge of insulating spacer 14 therebetween. The grounded housing section 41a is then secured within enclosure tube 18 in a manner similar to that described hereinabove in connection with FIGS. 1–3 by means of the metallic tabs 19 and the support plates 20. Due to the fact that separate and independent grounded housing sections are employed and that they are generously spaced from one another, each of the sections may be rigidly secured to enclosure tube 18 without any concern for thermal expansion and/or contraction of the grounded housing sections as is required in the embodiment of FIGS. 1–3.

In the embodiment of FIGS. 4 and 5, perforation of each grounded housing is no longer necessary. Instead, a perforated steel ground screen 44 provided with openings 45 is positioned within enclosure tube 18 and is welded across the bottom of the enclosure tube as shown. In the same manner as was described hereinabove in connection with FIGS. 1–3, metallic particles which may be located in the space between the inner conductors of each phase and their associated grounded housing sections will ultimately "dance" out of these regions, will pass through the openings 45 in ground screen 44 and fall into the hollow "dead" space between the interior surface of enclosure tube 18 and the bottom surface of screen 44 so as to remain in this dead space and thereby have no effect upon the operation of the underground assembly.

It can be seen from the foregoing description that the present invention provides a novel assembly for underground installations of isolated phase pressurized-gas-insulated transmission systems in which:

conducting particles are eliminated from the influence of dielectric fields created within the transmission system so that flashover voltage is greatly improved, whereby an underground system having the same dimensions as above ground systems will have greatly improved reliability or whereby the cross-sectional area of the underground system can be reduced appreciably while retaining the same level of reliability as above ground systems.

The field welded enclosure tube can be steel since all threee phases are inside the same enclosure tube and only minor local circulating currents are induced in the enclosure. The steel tube, with lower thermal expansion and higher strength than aluminum, for example, eliminates the need for any expansion joints whatsoever.

Simple machine-made butt welds can be employed in field welding the steel enclosure tubes. Only one field weld is needed for each three-phase shipping section. The steel butt welds are strong enough so that the three-phase enclosure tube can be welded and corrosion protection applied above the trench into which the bus section is installed, in the case of underground systems, or above the water surface, in the case of underwater systems and the section can then be lowered into place after welding. Corrosion protection of the steel enclosure tube is now a relatively simple and standardized matter and is no more difficult than that of protecting steel, gas, oil or water pipe lines.

Transmission losses are lower in the underground system of the present application since the $I^2R$ loss due to the circulating currents in each of the three single phase grounded enclosure tubes is eliminated.

The volume of earth to be excavated from the trench and backfilled with high thermal conductivity sand is significantly reduced with the design of the present invention as compared with three isolated phase conductors which must be buried approximately 1 foot apart to allow for welding about each enclosure tube.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A multiphase electrical power transmission system comprising
a tubular metallic conductor for each of said phases having their longitudinal axes arranged at equally spaced intervals about an imaginary circle;
a grounded metallic enclosure surrounding all of said conductors and being coaxial with the center of said imaginary circle;
a plurality of groups of grounded metallic housings each having within each group surrounding an associated one of said conductors, the housings within each group being arranged at spaced intervals along their respective conductors and spaced from one another so as to provide gaps between the outer surfaces of the groups of adjacent housings;
each housing encircling at least one insulating spacer supporting its associate conductor for maintaining its encircling housing in concentric arrangement with its associated conductor;
the gaps between adjacent housings being greater than the axial length of the housings mounted along each conductor;
means secured between said enclosure and said housings for maintaining said conductors in the aforesaid arrangement, and for electrically grounding said housings to said enclosure;
a perforated metallic sheet mounted within said enclosure and positioned across the bottom of said enclosure; said sheet being electrically connected to said enclosure to form a hollow truncated cylindrical region for collecting particles which may be present within the interior of said enclosure, said region being free of any voltage gradient to retain particles entering said region within said region.

2. The assembly of claim 1 wherein said enclosure is formed of steel.

3. The assembly of claim 2 wherein said conductors and said housings are formed of aluminum.

4. The assembly of claim 1 wherein said transmission system is a three phase system having first, second and third conductors for each of the three phases; the longitudinal axes of said conductors being arranged in a delta configuration.

5. The assembly of claim 1 wherein the free ends of said conductors are provided with plug-in contact assemblies for joining said conductors to associated conductors of adjacent assemblies.

6. The assembly of claim 1 wherein the interior of said enclosure is filled with a high dielectric insulating gas.

7. A multiphase electrical power transmission system comprising
a tubular metallic conductor for each of said phases having their longitudinal axes arranged at equally spaced intervals about an imaginary circle;
a grounded metallic enclosure surrounding all of said conductors and being coaxial with the center of said imaginary circle;
a plurality of groups of elongated grounded metallic housings the housings of each group being arranged at apaced intervals and surrounding an associated one of said conductors;
each housing encircling at least one insulating spacer supporting its associate conductor for maintaining its encircling housingin concentric arrangement with its associated conductor;
the gaps between adjacent housings of a group being adapted to allow particles to fall therethrough;
means secured between said enclosure and said housings for maintaining said conductors in the aforesaid arrangement and maintaining said housings a spaced distance from said enclosure, and for electrically grounding said housings to said enclosure;
said housings each being perforated to permit particles which may be present in the region between a conductor and its associated grounded housing to pass through said openings to enter into the hollow region between the exteriors of said housings and the interior of said enclosure, which region has no voltage gradient in order to retain particles entering said region within said region.

8. A multiphase electrical power transmission system comprising
a tubular metallic conductor for each of said phases having their longitudinal axes arranged at equally spaced intervals about an imaginary circle;
a grounded metallic enclosure surrounding all of said conductors and being coaxial with the center of said imaginary circle;
a plurality of groups of elongated grounded metallic housings the housings of each group being arranged at spaced intervals and surrounding an associated one of said conductors;
each housing encircling at least one insulating spacer supporting its associate conductor for maintaining its encircling housing in concentric arrangement with its associated conductor;
the gaps between adjacent housings of a group being adapted to allow particles to fall therethrough;
means secured between said enclosure and said housings for maintaining said conductors in the aforesaid arrangement and maintaining said housings a spaced distance from said enclosure.

* * * * *